Sept. 21, 1965 W. LIMBERGER 3,207,050
APPARATUS FOR THE PRODUCTION OF COPIES
Filed July 19, 1962 3 Sheets-Sheet 1
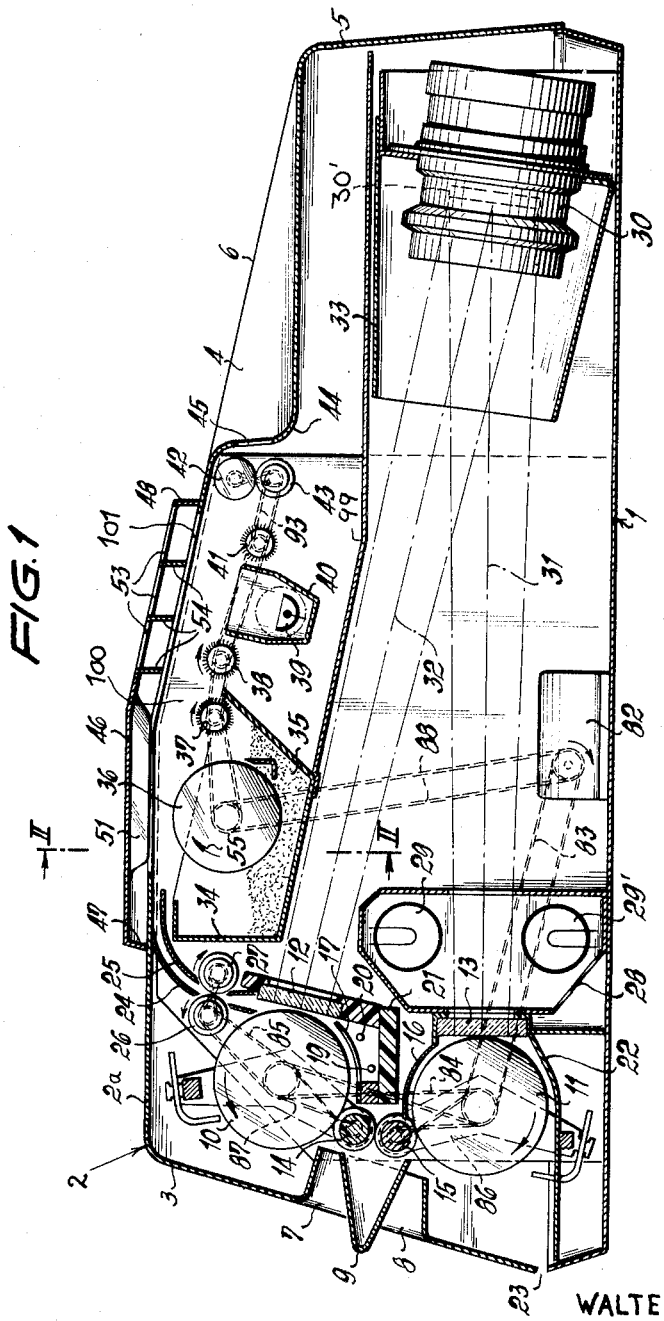
INVENTOR:
WALTER LIMBERGER
BY
AGENT Sept. 21, 1965 W. LIMBERGER 3,207,050
APPARATUS FOR THE PRODUCTION OF COPIES
Filed July 19, 1962 3 Sheets-Sheet 2
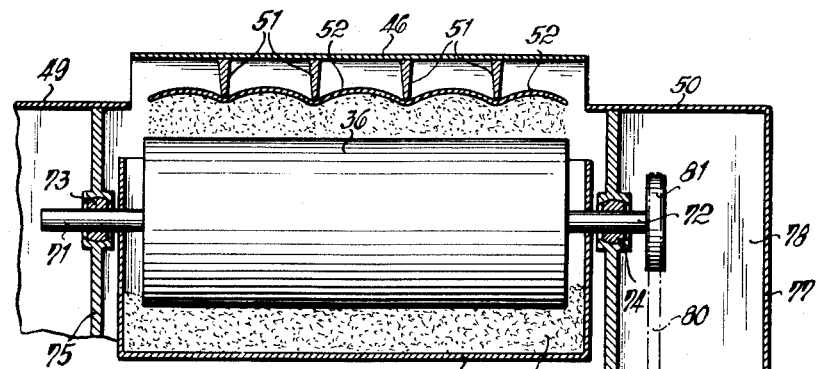
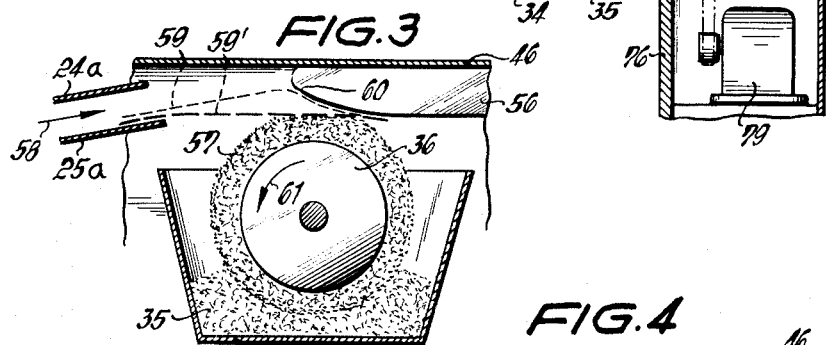
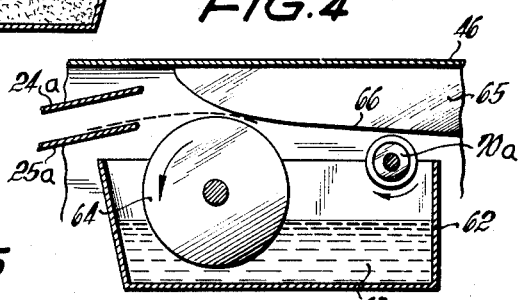
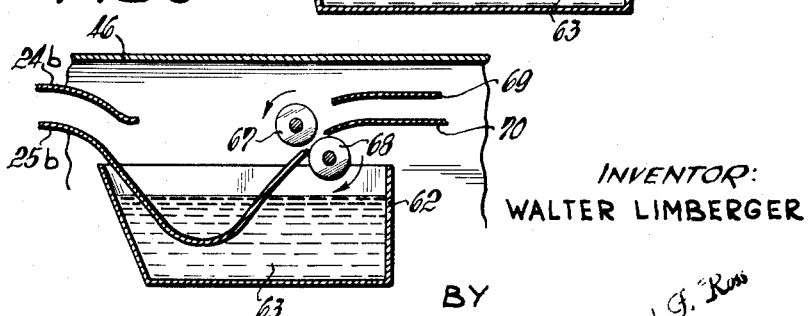
INVENTOR:
WALTER LIMBERGER
BY
Karl F. Ross
AGENT Sept. 21, 1965   W. LIMBERGER   3,207,050
APPARATUS FOR THE PRODUCTION OF COPIES
Filed July 19, 1962   3 Sheets-Sheet 3

INVENTOR:
WALTER LIMBERGER

BY  *Karl J. Ross*

AGENT

United States Patent Office 3,207,050
Patented Sept. 21, 1965

3,207,050
APPARATUS FOR THE PRODUCTION
OF COPIES
Walter Limberger, Hamburg-Poppenbuttel, Germany,
assignor to Lumoprint Zindler K.G., Hamburg,
Germany
Filed July 19, 1962, Ser. No. 210,971
Claims priority, application Germany, July 25, 1961,
L 39,616
8 Claims. (Cl. 95—1.7)

My present invention relates to an apparatus for exposing and developing copy sheets, more specifically an apparatus for reproducing the contents of a master sheet on a photosensitive copy sheet with the aid of an optical arrangement inside a housing for directing light rays from the illuminated master sheet or original onto the copy sheet as the two sheets are moved simultaneously past respective windows. A system of this type has been disclosed in my U.S. Patent No. 3,005,389 issued October 24, 1961.

In such a system, in which the two windows are defined by transparencies that are nearly parallel to each other, a light path extends from the master sheet to a remote reflector inside the housing from which a second light path leads to the copy sheet, the two light paths including a small angle with each other. An inherent advantage of this arrangement is that it provides an elongated ray path permitting the use of a projection object of relatively large focal length in that ray path and, consequently, enabling sharp focusing of the projected image without imposing too rigid restrictions upon the location and flatness of the sheets.

In prior systems, the further treatment of the exposed copy sheet took place along a guide path which extended generally transversely to the path of the light rays to and from the reflector, this guide path leading past suitable means for developing and fixing the latent image produced on the copy sheet. As a result of this arrangement, the apparatus required was relatively bulky since the vertical and horizontal dimensions of its housing had to be sufficient to accommodate the mutually perpendicular guide and light paths. The principal object of my present invention is to provide a more compact arrangement for a system of the general type referred to.

It is also an object of this invention to provide improved guide means for an exposed copy sheet on its travel past a developer device, designed to prevent smudging of the reverse side of the sheet by the developing material.

In accordance with my instant invention I arrange the optical system and the guide means for the copy sheet in such manner that the guide path for this sheet, from a location just beyond the exposure device to an outlet at which the copy sheet is to be ejected from the housing, extends generally parallel to the aforedescribed light paths along a wall of the housing adjoining the one at which the copy sheet and the master sheet are admitted; the last-mentioned wall may then be made short with reference to the adjoining wall along which the guide path for the copy sheet extends. Advantageously, for maximum compactness and stability as well as ease of handling, the two sheets are fed into the housing at a relatively low front wall, the master sheet being then guided downwardly along a lower path past its illuminating transparency whereas the copy sheet is guided along an upper path, past its exposure transparency, and then proceeds just below the top wall of the housing.

In order to separate the developing and fixing means from the optical system, the housing is preferably subdivided by a substantially horizontal partition into a lower projection chamber and an upper treatment chamber, the latter including a container for developing material advantageously supported on the partition itself. An applicator within the container may have the form of a roller, rotatable about a horizontal axis, adapted to apply the treating agent to the underside of a copy sheet passing thereover. The nature of this treating agent will be determined by the character of the photosensitive copy sheet introduced into the apparatus; thus, with a photographic paper of the reversing type, the treating material may be a combined developing and fixing liquid as described, for example, in U.S. Patent No. 2,899,335. In the preferred application of my invention to a xerographic system, however, the treating material may comprise particles of magnetizable material to be picked up by the applicator which in this case may be a magnetic roller; an arrangement of this general type has been disclosed in my prior Patent No. 3,058,405 issued October 16, 1962.

As the copy sheet advances along the top wall of the housing it should be held out of contact with the underside of that wall which may have been soiled by drops or particles of the developing material. For this purpose, in accordance with another feature of my invention, I provide spacer means on that top wall above the upwardly open container and its applicator, preferably in the form of blade-shaped webs depending from the top wall and extending parallel to one another in the direction of feed so as to bear from above upon the reverse side of the sheet which is being treated. If the applicator roller beneath this web is so driven as to rotate in the direction of sheet advance, it will effectively constitute part of the feed means for conveying the copy sheet towards its outlet; this will be true even though, as in the case of a magnetic roller, the applicator will contact the sheet not directly but through the intermediary of a brushlike envelope of attracted particles of developing powder. This powder, adhering to selected portions of the exposed sheet of electrostatically chargeable material, is then fixed onto the sheet by thermal fusion as is well known per se.

Further advantages and features of the invention will be evident from the following description of certain embodiments thereof schematically illustrated in the accompanying drawing, in which:

FIG. 1 shows an elevation of an apparatus according to the invention in section, the parts essential to the invention being shown schematically;

FIG. 2 shows a partial section taken along the line II—II of FIG. 1;

FIG. 3 shows a partial side view of a modified embodiment of the invention;

FIG. 4 shows a partial side view of a further embodiment of the invention;

FIG. 5 shows a partial side view of still another embodiment of the invention.

Figure 6:
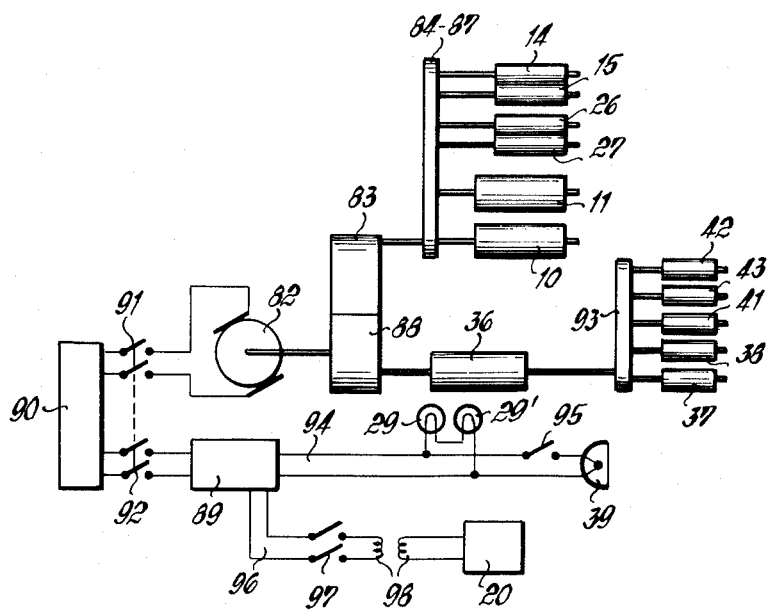
FIG. 6 diagrammatically shows a circuit arrangement and coupling mechanism for the device shown in FIG. 1.

The device of FIGS. 1, 2 and 6 comprises a lower housing part 1 and a detachable upper housing part 2, which together form a flat elongated apparatus with a sloping front wall 3. On the side of the apparatus opposite the front wall 3 the upper part is provided with a step-shaped depression 4 at the sides of which side parts 6 inclined to the rear wall 5 may remain.

On the end wall 3 are provided inlet means having inlet slots 7, 8 which are formed by a common opening in the housing and serve to receive a copy sheet and an original or master sheet, respectively. This opening is divided by a V-shaped guide element 9 projecting into the housing.

Behind the front wall 3, two pressing and transport rollers 10, 11 are rotatably mounted, one above the other, for example in side or intermediate walls of the housing, and are each provided with a transparent exposure platform forming a respective window 12, 13.

The exposure windows 12, 13 may for example be glass plates mounted in a known manner in holders and may have apertures designed as light stops.

Transport rollers 14, 15 co-operate with the rollers 10, 11. The transport rollers 14, 15 are arranged at the inner ends of the V-shaped guide element 9 so that they guide the sheets fed in over the guide elements to the associated rollers 10, 11 and, in co-operation with those rollers, transport the sheets to the exposure and illumination apertures 12, 13. Between the roller 15 and the exposure window 13, there is provided a guide surface 17. The roller 15 (and also the roller 14) may be provided with circumferential grooves in which adjacent ends of this guide surface engage.

Between the roller 14 and the exposure window 12 there is provided a guide member 16 of non-conductive material which is spaced from the roller 10 but substantially coaxial therewith. Beneath the guide member 16 there are disposed electrodes 19, 20 which can be held at a potential for charging the copy sheet passing through. Beneath the electrodes 19, 20 there is disposed an insulating plate 21. A corresponding plate is provided laterally of the electrodes and forms an extension of the aperture 12.

The window 13 is followed by a guide surface 22 which extends to the outlet slot 23 for the original. The original thus passes along a path from the inlet slot 8 to the roller 15 and roller 11, between the roller 11 and the window 13, and over the guide surface 22 to the outlet slot 23.

The path of the copy sheet beyond the aperture 12 is determined by guide elements 24, 25, which are curved so that their upper ends are parallel to the cover of the housing, and by two transport rollers 26, 27, which are suitably provided with peripheral slots so that they contact only limited regions of the sheets.

The device comprises exposure light sources 29, 29' screened by a shielding wall 28, and an objective 30 including a lens system and, on its rear walls facing away from the rollers, a mirror 30' at which the image rays 31, 32 are reflected. These rays thus pass through the same objective. The objective is suitably arranged in a box-type shield 33 to cut out peripheral-ray effects and also to prevent contamination of the objective. The two nearly horizontal light paths to and from the optical focusing device 30, defined by the rays 31 and 32, lie in a portion of the housing bounded by a partition 99.

The guide elements 24, 25 terminate above a container 34 in which a pile of developer powder 35 is provided and which is shown rigid with partition 99. A magnet roller 36 rotates in the container, for example in the direction indicated by arrow 55 (i.e. clockwise). On the periphery of this magnet roller there is formed a brush-like accumulation of particles which projects into the path extending above the container 34. Rotation in the clockwise direction prevents the leading edge of the copy sheet from cutting through the tufts of the brushlike accumulation which has been designated 57 in FIG. 3.

Beyond the magnet roller 36, pin wheels 37, 38 forming the lower limit of the guide path are rotatably mounted in the side wals of the housing. The guide path then passes over a fixing device in the form, for example, of infrared radiators 39 arranged in an upwardly open shield-like housing 40. Beyond this housing 40 are provided further wheels 41 with pins for supporting the copy material. It is to be noted that in each case a plurality of such pin wheels are arranged on one shaft in order to guide the material sheet with a better handling of the surface.

A pair of contacting transport rollers 42, 43 are provided beyond the pin wheels 41 in the direction of advance of the copy material. The upper roller 42 has for example a rubber or textile surface while the lower roller 43 is formed knurled or provided with peripheral grooves so that the image side of the copy sheet passing thereover is engaged as little as possible.

Beyond the roller pair 42, 43 the top wall 2a of the housing is formed with a descending step 44, at least in the middle region of the housing, to define the aforementioned depression 4. An outlet slot 45 is provided in this step.

Thus the guide path beyond the guide elements 24, 25 is defined, apart from the roller 42, by a succession of rotatable lower guide elements or wheels within a treatment chamber 100 bounded by top wall 2a of the apparatus and the partition 99 below it.

Advantageously, the top wall 2a is provided with an opening 101 extending therethrough above the developer device and the exposure device, the opening 101 being spacedly overlain by a raised cover plate 46. This cover plate is for example supported at its front and rear edges by means of flanges 48, 47 on the top wall 2a. Advantageously, the sides between the cover plate 46 and the edges 49, 50 of the housing top are open. The top wall 2a, in this special construction the cover plate 46 thereof, carries blade-shaped webs 51 extending parallel to the direction of advance and directed donwardly to bear on the sheet of copy material 52 (see FIG. 2). In the preferred embodiment, these webs merely serve to prevent contact of the copy material 52 with the underside of the cover plate 46 which is swept by the brush of magnetic particles from roller 36 during periods when no copy material is present, so that contamination of the reverse side of the copy sheet 52 is avoided.

The webs 51 facing the magnet roller 36 are representative of a variety of elements for guiding the copy material, including pin wheels of the type illustrated at 37, 38, 41.

FIG. 3 shows a modified form of the guide webs on cover plate 46 which are here designated by reference numeral 56. These webs 56 are disposed above the magnet roller 36 on which a brush 57 of magnetic particles is formed. A copy sheet 59 is fed by the guide elements 24a, 25a in the direction of the arrow 28. These guide elements are directed so that the leading edge of the sheet 59 passes over the top of the roller 36 to upwardly curved edges 60 of the webs 56. On these edges 60, the edge of the copy material slides downwardly on further advance so that the sheet comes into the position 59' in which it is pressed onto the magnet brush 57 which rotates in the direction of the arrow 61 (i.e. counterclockwise). It can be seen that the widest portion of the webs 56 are disposed at a location which is displaced towards the right with respect to the top of the roller 36.

In this way, with rotation of the roller in the direction indicated, the leading edge of the copy sheet 59 is prevented from cutting through the powder brush 57. With the counterclockwise direction of rotation shown, the rear edge of the sheet can move past the magnet roller without danger of being dusted on its reverse side.

It is to be understood that a plurality of webs 56 are arranged alongside one another as illustrated in FIG. 2 for the webs 51. It is also possible to provide a guide surface corresponding to the edges 60, since this guide surface can be formed so that it always lies above the developer-powder brush 57 and there is therefore no danger of contamination.

Above the fixing device 39, 40 known ventilation slots 53 (FIG. 1), bounded advantageously by downwardly bent slats 54, are provided. Heat can escape through these openings.

As shown in FIG. 4, development is effected by a liquid 63 in a container 62 corresponding to the container 34. A moistening roller 64 rotates in the direction shown by the arrow (counterclockwise) within this container and partially in the liquid, the copy sheet fed by the guide elements 24a, 25a being pressed onto roller 64 by means of guide elements 65 corresponding to the webs 56 of FIG. 3 so that wetting of the sheet above its leading edge is prevented. It can be seen that the top of the moistening roller 64 lies above the imaginary extension of the lower edges 66 of the webs 65 toward the guide elements 24a, 25a, the spacing between the rollers 64 and the webs 65 being so small that the liquid is applied immediately behind the leading edge of the sheet. Since there is initially an accumulation of liquid on the surface of the copy material, sufficient liquid is present to spread to the leading edge of the sheet, particularly if the lower guide edge 66 is inclined downwardly in the direction of advance.

As shown in FIG. 5, the lower guide element 25b is curved downward in a known manner in an arc through the container 62 with the developer and fixing liquid, the copy sheet being guided in the container in a direction corresponding to the curvature on the guide element 24b. Consequently, the copy sheet is fed through the liquid 63 to a pair of squeezing rollers 67, 68 and thence through the guide elements 69, 70 into the remaining part of the treatment path. The lower guide element can also comprise transport rollers or wheels (e.g. pin wheels) as shown at 70a in FIG. 4.

When a liquid is used, it is also recommended to provide a drying station corresponding to the parts 39 and 40 in FIG. 1, comprising for example a heat radiator advantageously disposed beneath the upper venting apertures 53, although it is also possible to use a pair of squeezing and transport rollers, such as the roller pair 67, 68, in place of the roller pair 42, 43.

If it is desired to use the apparatus of FIG. 1 for treating a photographic material with the liquid fixer-developer 63 provided in the container 62, the charging device 19, 20 required for treating an electrophotographic copy material can be switched off and the container 62 can be substituted for the container 34 and its applicator 36, the apparatus being thus easily adaptable for treating different materials.

All rotating parts are mounted in a manner not further shown in the side walls or intermediate walls of the housing which extend parallel to the planes of FIGS. 1 and 3–5. At least at one side there is disposed a chamber for receiving drive and connection units. In addition, transmission and reduction gears between the driven parts are provided in this chamber. The drive directions are indicated by respective arrows.

The drive and connection elements are shown only schematically in FIG. 1 and have also been illustrated in FIG. 6. Reference numeral 82 indicates a drive motor whose drive shaft turns clockwise in FIG. 1, as indicated by the arrow. From this drive shaft a transmission 83 drives the pressing and transport roller 11, and from the latter a transmission 84 drives the transport and pressing roller 10, whence a further transmission 85 drives the transport-roller pair 26, 27. The rollers 14, 15 are driven from the transport and pressing rollers 10, 11 by transmission 86, 87.

From the drive motor 82 a transmission 88 drives the applicator 36 and, from this, an advantageously common transmission 93 drives the pin wheels 37, 38, 41 and the roller pair 42, 43. An electric current source 89 (FIG. 6) is also arranged in the housing and has terminals to which the charging electrodes 20 and, by means of another circuit, the exposure light sources 29, 29' and the radiator 39 are connected.

In FIG. 6 the common power supply is indicated by reference numeral 90. The drive motor 82 and the current source 89 are switched on by ganged switches 91, 92.

Two circuits extend from the current source 89. The circuit 94 contains the exposure light sources 29, 29' and the radiator 39 which can be connected via a special switch 95. A further circuit 96 extending from the source 89 can be separately connected via a switch 97 and contains transformer means 98 to which the charging device including the charging electrodes 20 is connected.

An example of the general mounting arrangement is shown in FIG. 2, in which the magnet roller 36 has journals 71, 72 extending through the side walls of the container 35 and carried in bearings 73, 74 arranged in the intermediate housing walls 75, 76. Between the intermediate wall 76 and the outer wall 77 of the housing there is a space 78 for receiving a drive unit 79 and a transmission belt 80 which extends to a pulley 81 on the journal 72. The transmission 88 shown in FIG. 1 is, of course, not used when the motor 79 individual to roller 36 is employed.

The above arrangement provides a flat, easily operable apparatus for the treatment of electrophotographic material which is surprisingly compact by virtue of the special arrangement of the inlet 7, 8 at one of the minor sides of the housing 1, 2 which is of elongated cross-section, the guide path for the copy sheet past the exposure device 10, 12 and the treatment section 34, 36 (or 62, 64 etc.) extending along the upper side of the housing in a direction generally parallel to the path of the light rays 31, 32 from the illuminating device 11, 13, 28 via reflector 30 to the exposure device.

I claim:

1. An apparatus for reproducing the contents of a master sheet on a photosensitive copy sheet, comprising a housing of horizontally elongated cross-section having a relatively low front wall and a relatively long top wall adjoining said front wall and extending rearwardly therefrom; inlet means at said front wall for admitting a master sheet and a copy sheet side by side into said housing; first and second window means positioned in a region of said housing adjacent said front wall on opposite sides of said inlet means, said first window means being disposed below said second window means; first and second feed means for concurrently leading said master sheet and said copy sheet past said first and second window means, respectively, along a lower and an upper guide path terminating at a first outlet for said master sheet and a second outlet for said copy sheet; illuminating means at said first window means positioned to transmit light rays from said master copy over a first elongated light path substantially horizontally through said housing; optical focusing means at the end of said first light path including reflector means for directing said light rays onto said second window means over a second elongated light path inclined at a small angle with reference to said first light path, thereby exposing said copy sheet and creating a latent image thereon; partition means in said housing extending substantially horizontally below a portion of said top wall and forming therewith a treatment chamber within said housing, said upper guide path leading within said chamber from a location just beyond said second window means to said second outlet; curved deflecting means in said upper guide path just ahead of said portion for turning said copy sheet from an upward direction generally parallel to said front wall into a direction generally parallel to said top wall with the exposed side of said copy sheet facing downwardly, and developer means for said latent image disposed below said second guide path in said chamber, said developer means including an upwardly open container for developing material on said partition means and a rotary applicator for said material in said container, said top wall being provided on its underside with spacer means above said container for keeping said copy sheet out of contact with said underside during application of said developing material to the lower surface of said copy sheet.

2. An apparatus as defined in claim 1 wherein said top wall is formed with a descending step beyond said developer means, said second outlet being provided in said step.

3. An apparatus as defined in claim 1 wherein said spacer means comprises a plurality of blade-shaped webs depending from said top wall, said webs extending alongside one another in the direction of feed of said copy sheet.

4. An apparatus as defined in claim 3 wherein said applicator comprises a roller rotatable about a horizontal axis underneath said webs.

5. An apparatus as defined in claim 4 wherein said roller is provided with drive means for rotating it in the direction of feed of said copy sheet.

6. An apparatus as defined in claim 4 wherein said developing material comprises magnetizable particles, said roller being magnetic for picking up said particles in a brush-like formation sweeping the underside of said copy sheet.

7. An apparatus as defined in claim 6 further comprising electrostatic charging means for said copy sheet at said upper guide path between said inlet means and said second window means.

8. An apparatus as defined in claim 4 wherein said developing material comprises a liquid, said roller being disposed close enough to said upper guide path to moisten the underside of said copy sheet with said liquid while dipping into the latter.

References Cited by the Examiner

UNITED STATES PATENTS

| | | |
|---|---|---|
| 2,234,717 | 3/41 | Altman et al. |
| 2,907,674 | 10/59 | Metcalfe et al. _____ 95—1.7 X |
| 2,979,026 | 4/61 | Reuter _____ 95—1.7 X |
| 2,987,660 | 6/61 | Walkup _____ 95—1.7 X |
| 3,005,389 | 10/61 | Limberger _____ 95—1.7 |
| 3,040,704 | 6/62 | Bliss _____ 95—1.7 X |
| 3,043,684 | 7/62 | Mayer _____ 95—1.7 X |
| 3,088,386 | 5/63 | Sugarman _____ 95—1.7 |

EVON C. BLUNK, *Primary Examiner.*